No. 795,024. PATENTED JULY 18, 1905.
F. E. CASE.
PNEUMATIC SYSTEM OF MOTOR CONTROL.
APPLICATION FILED DEC. 5, 1902.

Witnesses.
J. Ellis Glenn.
Helen Orford.

Inventor.
Frank E. Case.
by Albert G. Davis
Atty.

No. 795,024.

F. E. CASE.
PNEUMATIC SYSTEM OF MOTOR CONTROL.
APPLICATION FILED DEC. 5, 1902.

Witnesses.
J. Ellis Glenn.
Helen Orford.

Inventor.
Frank E. Case.
by Albert G. Davis
Atty.

No. 795,024. PATENTED JULY 18, 1905.
F. E. CASE.
PNEUMATIC SYSTEM OF MOTOR CONTROL.
APPLICATION FILED DEC. 5, 1902.

Witnesses.
J. Ellis Glenn.
Helen Orford

Inventor.
Frank E. Case
by Albert G. Davis
Atty.

No. 795,024. Patented July 18, 1905.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

PNEUMATIC SYSTEM OF MOTOR CONTROL.

SPECIFICATION forming part of Letters Patent No. 795,024, dated July 18, 1905.

Application filed December 5, 1902. Serial No. 134,001.

*To all whom it may concern:*

Be it known that I, FRANK E. CASE, a citizen of the United States, residing at Schenectady, in the county of Schenectady, State of New York, have invented certain new and useful Improvements in Pneumatic Systems of Motor Control, of which the following is a specification.

This invention relates to systems of motor control, and is especially designed for the control of a plurality of motors on electrically-propelled vehicles coupled together to form a train.

More particularly stated, my invention relates to systems of control in which the individual master or motor controllers on each motor-car of a train are actuated simultaneously by fluid-pressure controlled from any predetermined point on the car or train by means of a controlling or motorman's valve.

The object of my invention is to provide a pneumatic system of train control the operative parts of which are simple in construction and effective in operation and in which a small number of train-pipes are employed.

A further object of my invention is to prevent accident due to a reversal of the motor connections in case the train-pipes or connections thereto become broken or otherwise injured.

In pneumatically-actuated systems heretofore proposed, in which but two train-pipes are used, it is necessary to vary the pressure of the compressed fluid admitted to said train-pipes from the source of supply in order to produce the desired movements of the controlling and reversing switches. In such systems it is also necessary to have controller-actuating mechanisms which will be responsive to variations in the pressure applied to the train-pipes, thus necessitating complicated devices requiring delicate adjustment.

In the system herein disclosed the two train-pipes are so connected to each of the controlling-switch and the reversing-switch mechanisms throughout the train that upon the admission of the compressed fluid at substantially a constant pressure to the train-pipes in a predetermined order the desired motor connections in series and parallel for either forward or reversed direction of rotation are made.

More specifically considered, my invention consists of a plurality of master or motor controllers mounted on the motor-cars of the train, each of said controllers comprising a controlling-switch, a reversing-switch, and a series stop connected with said controlling-switch, said switches and series stop being operated by pneumatically-actuated mechanism operatively connected with two train-pipes, which are adapted to receive compressed fluid at substantially a constant pressure from a source of fluid-pressure supply through a valve or valves under the control of the motorman. The system is so constructed and arranged that the compressed fluid is admitted to the controlling-switch-actuating mechanism after the reversing-switch has been moved into the desired position, said position being determined by the admission of compressed fluid to one or the other of said train-pipes. The pneumatically-actuated series stop of each controller, which prevents the controlling-switch from moving past the final series position, is released to allow the controlling-switch to move into its parallel operative positions by applying pressure to the train-pipe which was not used while the controller was being moved through its series positions.

My invention further consists of means for allowing the controller to return to its initial or "off" position and for preventing the movement of the reversing-switch into its reversed position in case one of the train-pipes should become accidentally broken, said means comprising an automatically-actuated valve so constructed and arranged relative to the train-pipes that it will exhaust to atmosphere or "bleed" the train-pipe which for the time being is acting as the "parallel" pipe—that is, the train-pipe into which the compressed fluid is last admitted—in case the other or "series" train-pipe should break while the controller is being operated in its parallel position.

My invention further comprises improvements in details of construction and combination of parts, which will be clearly described in the following specification, and more specifically set forth in the appended claims.

In the accompanying drawings, which illustrate the preferred embodiments of my invention.

Figures 1, 16:
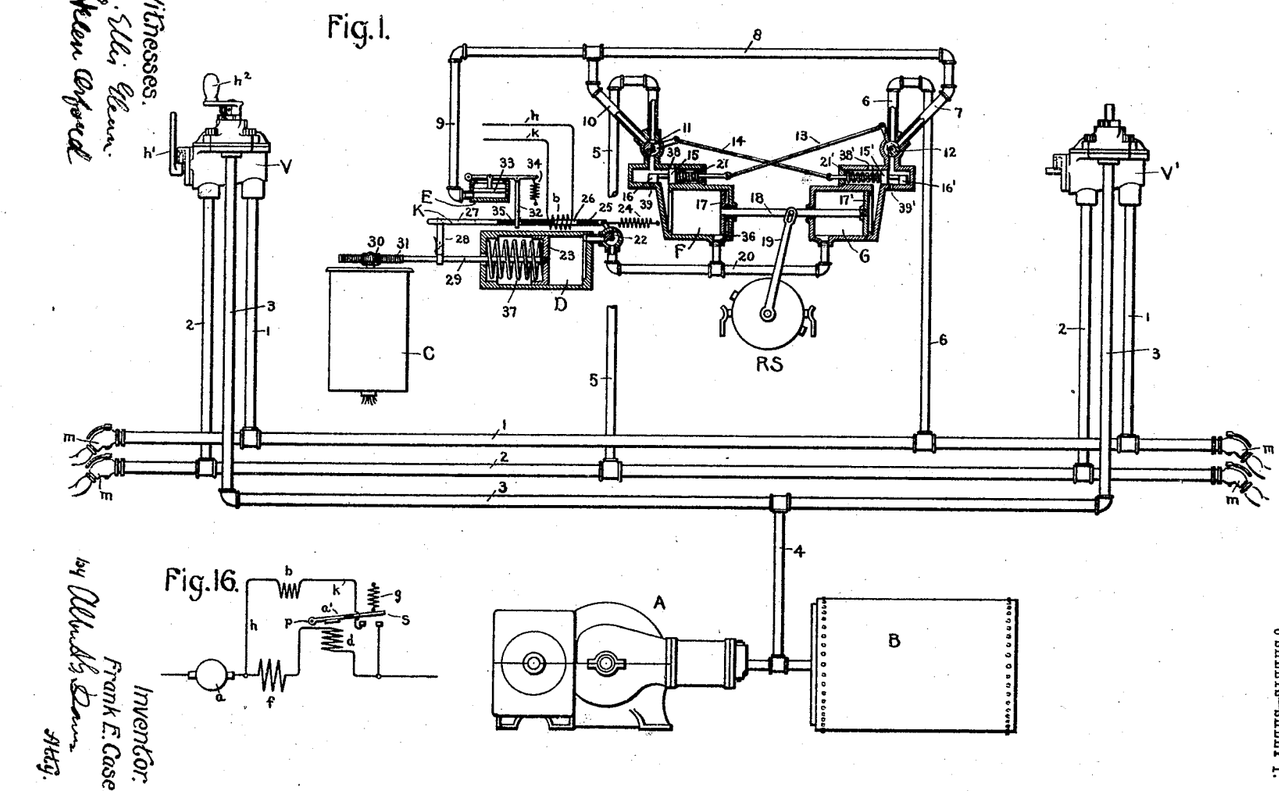
Figure 1 is a diagrammatic representation of a single-car equipment in a pneumatic train-control system for securing the simultaneous operation of a plurality of motor-controllers throughout the train.
Fig. 16 is a diagram of the electrical connections for operating the current-limiting device shown in Fig. 1.

Referring now to Fig. 1, C represents a controller on one of the cars of a train. This controller may be a motor-controller of the ordinary type, or it may be a master-controller, which in turn controls a motor-controller on the car. The reversing-switch RS is ordinarily connected to the controller C by means of an interlocking device, (not shown,) but may be mechanically independent thereof and located in another part of the car or train. The pneumatically-actuated piston 23, which is located within the cylinder D, operates the contact-drum of the controller C through the rack-and-pinion mechanism 31 and 30, said rack being formed on or connected to the piston-rod 29. A motor-driven air-compressor which supplies the compressed fluid for operating the controllers throughout the train is represented by A and is directly connected to the compressed air or other fluid reservoir B. Connected with this reservoir B is a pipe 4, which is connected through the pipe 3 to the motorman's valves V and V', located at any convenient points on the vehicle or car. F and G represent the cylinders into which the compressed air or other fluid is admitted in order to move the reversing-switch RS into the desired position before admitting it to the cylinder D to operate the controller C. The reversing-switch-actuating pistons 17 and 17' in the cylinders F and G, respectively, are operatively connected with the reversing-switch RS through the piston-rod 18 and crank 19. The said cylinders are connected to the train-pipes 1 and 2 through the connecting-pipes 6 and 5, respectively. Located in the pipes 5 and 6, near the cylinders F and G, are the rotatable plug-valves 11 and 12, respectively, which are operatively connected with the slide-valves 15' and 15 through the connecting-rods 14 and 13, respectively. The said slide-valves are constructed and arranged to be operated by the compressed fluid as it is admitted to one or the other of the train-pipes to open the ports leading to one of the cylinders F and G and close the ports leading to the other cylinder through the operation of the corresponding rotatable plug-valve. Located within the cylinder E is the piston 33, which is operatively connected with a device for holding the controller-cylinder in its last series position, said device being hereinafter referred to as a "series stop." The cylinder E is supplied with compressed fluid at the proper time to release the series stop, so as to allow the controller to be moved forward from its last series position into its parallel positions. The said piston 33 is normally maintained in the position shown in Fig. 1 by means of the spring 34, thereby maintaining the rod 32 in the position shown. The lower end of said rod 32 is formed into a loop through which the rod K, which is made up of the metallic part 27, the insulating-strip 35, the soft-iron part 26, and the insulating-strip 25, reciprocates longitudinally. One end of the rod K is fastened to a lever connected directly with the rotatable valve 22, which is adapted to cut off the supply of compressed fluid to the controller-operating cylinder D. This valve is normally maintained open and the rod K normally maintained in a position to the right of that shown in Fig. 1 by means of the spring 24. The opposite end of the rod K is slotted so as to receive the upper end of the pin 28, which is carried by the piston-rod 29. The said pin 28 is pivoted to the piston-rod 29 in such a manner that it will operate within the slot in the part 27 of the rod K and will be prevented from leaving said slot when moving in one direction, but will yield so as to pass over the end of rod K and into said slot when moved in the opposite direction. As the piston 23 moves forward from its initial position into the position corresponding to the final series position of the controller the pin 28 moves from the right-hand end of the slot in the part 27 of the rod K to the left until it strikes the left-hand end and draws the said rod forward against the action of the spring 24 until the valve 22 is closed. The supply of compressed fluid to the cylinder D is thus cut off, thereby arresting the forward movement of the piston 23 and stopping the controller in its final series position. The part 26 of the rod K is made of magnetic material, so as to act as a core for the solenoid $b$, which is connected in a circuit in shunt to the field of one of the motors on the car in such a manner as shown in Fig. 16. In said figure the motor-armature is represented by $a$, while the motor-field is represented by $f$. The coil of the overload-magnet $d$ is connected in series with the motor-circuit, and as the current in said motor-circuit increases above a predetermined amount the said magnet $d$ attracts the armature $a'$, pivoted at $p$, and closes a shunt-circuit through the connection $h$, solenoid $b$, connection $k$, and the contacts of the switch $s$, the said switch being closed against the action of the spring $g$. When this shunt-circuit is completed, the solenoid $b$ is energized so as to draw its core 26 to the left against the action of the spring 24 and close the valve 21, thereby acting as a current-limiting device. The said valve is maintained in its closed position until the current in the motor-circuit has been reduced below the predetermined limit, at which time it is again opened and the controller is allowed to move forward.

The operation of the system shown in Fig. 1 is as follows: The direction of movement of the car is determined by connecting one or the other of the train-pipes 1 and 2 to the source of compressed fluid supplied through either of the engineer's valves V or V'. Consider that the valve V has already been turned to admit compressed fluid to the train-pipe 2. The compressed fluid now flows from the pipe 3 through the valve V, the specific construction of which will be hereinafter described, through the train-pipe 2, pipe 5, valve 11, which is normally in the position shown in Fig. 1, into the casing containing the slide-valve 15. As the pressure is applied to said slide-valve 15 it is moved to the right against the action of the spring 21, thereby uncovering the port leading to the cylinder F and operating the valve 12 in the pipe 6 through the agency of the connecting-rod 13. This movement closes the port leading to the cylinder G, thereby preventing the compressed fluid from being admitted to said cylinder until the pipe 2 is exhausted. The compressed fluid from the pipe 5 passes through the casing containing the valve 15 into the cylinder F and immediately actuates the piston 17, moving it to the right. This movement of said piston causes a movement of the reversing-switch RS into the position shown. When the piston 17 reaches the limit of its movement, it uncovers a port 36 in the cylinder F opening into the pipe 20, through which the compressed fluid passes into the casing containing the valve 22 and into the cylinder D, where it actuates the piston 23, moving it to the left against the action of the spring 37. The forward movement of the piston 23 is transmitted to the controller C through the rod 29 and the rack and pinion 30 and 31. This forward movement of the piston 23 is interrupted by the closing of the valve 22 when the controller reaches its last series position, the pin 28 engaging with the end of the slot in the part 27 of the rod K, as before described. When it is desired to move the controller into its parallel positions, the motorman's valve V is operated so as to admit pressure to the train-pipe 1, from which it passes into the pipe 6 through the casing containing valve 12, which is in position so as to close the port leading to the cylinder G, thence through the pipe 7, pipe 8, pipe 9 into the cylinder E. The piston 33 is thereby actuated against the action of the spring 34, lifting the rod K through the agency of the connecting-link 32, releasing it from engagement with the pin 28, and allowing the valve 22 to open by the action of the spring 24. The compressed fluid being again admitted to the cylinder D pushes the piston 23 forward to the full extent of its movement, and thereby moves the controller C into its final parallel position. It will be seen that the compressed fluid from the pipe 8 will be prevented from entering the cylinder F, since the valve 11 when in its normal position, as shown in Fig. 1, closes the passage-way between the connecting-pipe 10 and the said cylinder F. When it is desired to return the controller or controllers to the off position in order to stop the train, the motorman's valve V is operated to exhaust the train-pipes 1 and 2 to the atmosphere in a manner to be hereinafter described. When the said train-pipes are exhausted, the slide-valve 15 moves to the left through the action of the spring 21, thereby returning said valve and the valve 12 to the normal inoperative position. This movement uncovers the exhaust-port 38, which allows the compressed fluid contained in the cylinders F and D to be exhausted to the atmosphere. The piston 23 is then moved back to its initial position by means of the spring 37, and thereby returns the controller to its off position. It will also be seen that the valves 15 and 15' are supplied with extensions 16 and 16', which operates to close the exhaust-ports 39 and 39', respectively, when the said valves are moved out of their normal inoperative positions. The said ports 39 and 39' are provided to allow the air or compressed fluid to be exhausted more expeditiously and also to provide an escape for the air which might be caught in the slide-valve chambers and act to cushion said valves. In order to reverse the direction of the train, the reversing plug-valve of the motorman's valve V, the handle of which is shown as $h'$ in Fig. 1, is operated so that compressed fluid will be admitted to the train-pipe 1 before it is admitted to the train-pipe 2, when the controlling-valve is operated. As the controlling or motorman's valve is moved forward compressed fluid is admitted into the cylinder G through the train-pipe 1 and connecting-pipe 6, thereby moving the reversing-switch RS into a position reverse from that shown in the figure. The circuit of the motor or motors is thereby completed for rotation in a reverse direction. The operation of the remainder of the system is the same as above described, it being understood that when the train is moving in the reverse direction the compressed fluid is admitted to the train-pipe 2 after it has been admitted to the train-pipe 1 when it is desired to move the controller from its final series position to its parallel positions.

Figure 2:
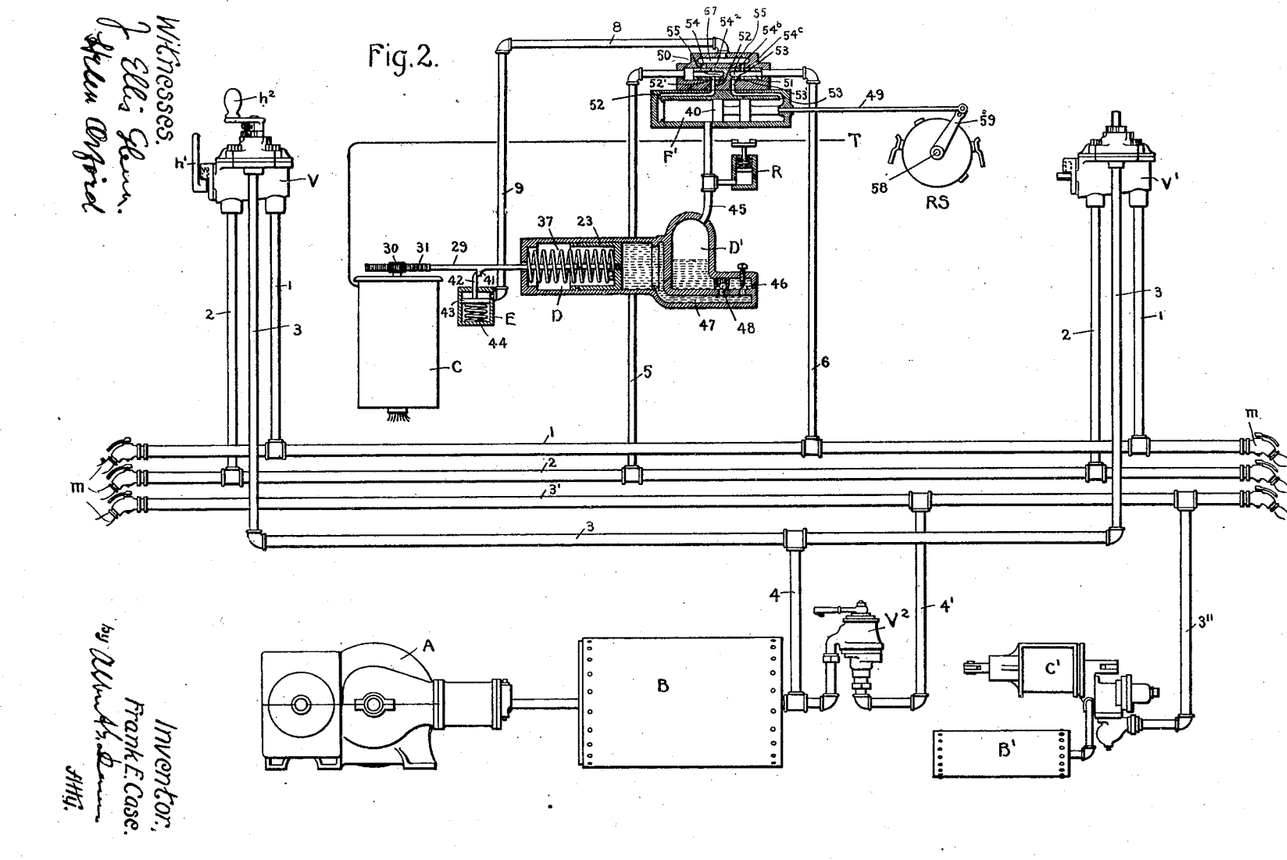
Fig. 2 is a similar diagrammatic representation of a modified system. This figure also illustrates how my invention may be operated in connection with one of the existing types of air-brake systems.
Figures 5, 6, 7:
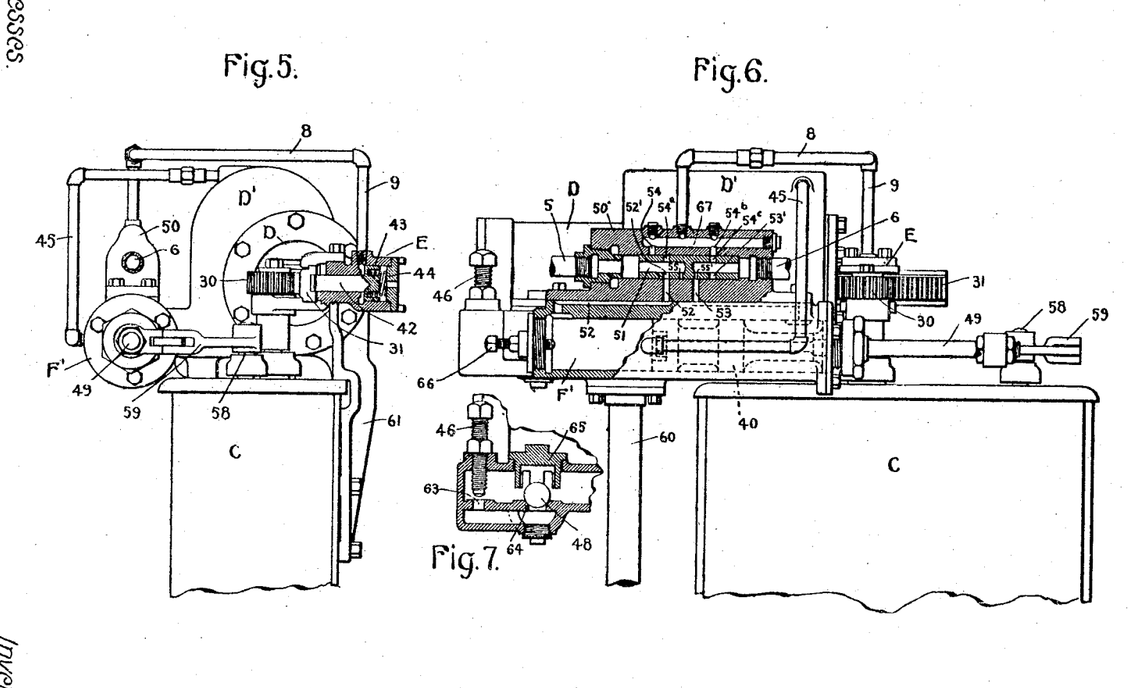
Fig. 5 is a right-hand side view of the controller-operating mechanism and illustrates the series stop partly in section.
Fig. 6 is a front elevation of the pneumatic controller-operating mechanism with the cylinder which contains the reversing-switch-actuating piston and also the automatic valve which controls the ports leading to said cylinder shown partly in section.
Fig. 7 is a detail sectional view of the check-valve and the adjustable valve which are used for controlling the flow of oil or other fluid between the oil-reservoir and the controller-operating cylinder.

Referring now to the modified system shown in Figs. 2 to 8, inclusive, C, as before, represents the controller which is operated pneumatically and is under control of the motorman's valves V and V'. RS is the reversing-switch, which is operated by means of the piston 40, contained in the cylinder F', the said piston being moved from one end of the cylinder F' to the other end, according to which of the train-pipes 1 and 2 first receives compressed fluid from the supply-pipe 3 through the operation of either of the motorman's valves V and V'. The fluid-compressor and storage-reservoir for compressed fluid are designated, respectively, as A and B, as before, and the connections between the pipe 3 and the storage-reservoir B is designated as 4, as before. In this figure an additional train-pipe 3' is shown, the said train-pipe being connected to the air-brake system in the customary manner. The air-brake cylinder on the car carrying the equipment illustrated in Fig. 2 is indicated by C', the auxiliary storage-reservoir for said air-brake being designated by B'. Connection between the air-brake train-pipe and the brake-cylinder is indicated by 3", and the connection from the said train-pipe to the air-brake engineer's valve $V^2$ is indicated by 4'. The controller-actuating piston 23 in this modification is contained within the cylinder D, said piston being normally maintained in position in the right-hand end of said cylinder D by means of a spring 37, and is connected to the drum or cylinder of the controller C by means of the rack-and-pinion mechanism 31 and 30, the said rack being carried by the piston-rod 29. The series-stop mechanism in this modification comprises a pin 42, carried by the piston 43, which is located within the cylinder E, said pin engaging a lug 41 on the piston-rod 29 when the piston 23 reaches the position corresponding to the final series position of the controller. The pin 42 is normally maintained in a position to be ready to engage said lug by means of the spring 44. The specific construction of this series stop is more clearly shown in Fig. 5. Connected with the cylinder D is an oil-reservoir D', and as compressed fluid is admitted to the said oil-reservoir through the pipe 45 the oil is forced from said reservoir through the port controlled by the adjustable valve 46 and the passage-way 47 into the said cylinder D. As the piston 23 is returned to its initial position after the pressure has been released from the oil-reservoir D', the oil passes from the cylinder D into the reservoir D' through the port controlled by the check-valve 48. As shown in Fig. 7, the adjustable valve 46 is adapted to control one of the ports between the oil-reservoir and the passage-way 47, the rate of flow of the oil through said port being determined by the distance the valve 46 is raised from its seat 63. The check-valve (shown in Fig. 7 as a ball-valve) rests normally upon its seat 64 and is forced therefrom by the oil in the cylinder D when the pressure is reduced in the reservoir D'. The valve 48 is constrained to move in substantially a vertical path by means of the cage 65. The position of said valves relative to the remainder of the apparatus is clearly shown in Fig. 4. Mounted on the cylinder F' is a valve-casing 50, into the opposite ends of which the pipes 5 and 6 lead. The said valve-casing contains the automatically-operated slide-valve 51, which is adapted to connect the pipes 5 and 6 to the ports 52 and 53, respectively. The valve 51 is provided with the ports 52' and 53', which are adapted to register with the ports 52 and 53, leading to opposite ends of the cylinder F. The said valve 51 is also provided with ports $54^a$ and $54^c$, which are adapted to register, respectively, with the ports 54 and 54$^b$, which lead to the chamber 67, with which the pipe 8 is connected. The pipe 8 is also connected to the series-stop cylinder E through the connecting-pipe 9. The valve 51 is also provided with the small ports 55 and 55', the function and operation of which will be hereinafter described. The specific construction of the mechanism above described is clearly shown in Fig. 6. The position of the valve 51 is determined by admitting compressed fluid to one or the other of the train-pipes 1 and 2. The piston 40, which is contained within the cylinder F', is connected to the reversing-switch RS through the connecting-rod 49 and crank 59, the crank 59 being attached directly to the shaft 58 of the reversing-switch. An adjustable stop 66 (shown in Fig. 6) is used to limit the movement of the piston 40 in the cylinder F'.

Figure 3:
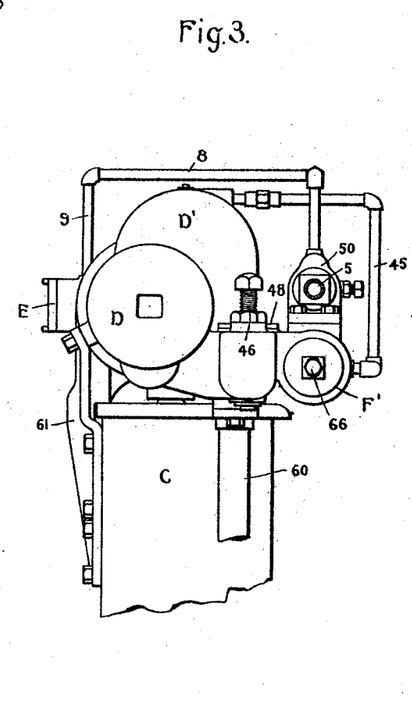
Fig. 3 shows a left-hand side view of my preferred form of the pneumatically-actuated mechanism which is adapted to be attached to the top of the ordinary master or motor controller casing.
Figure 4:
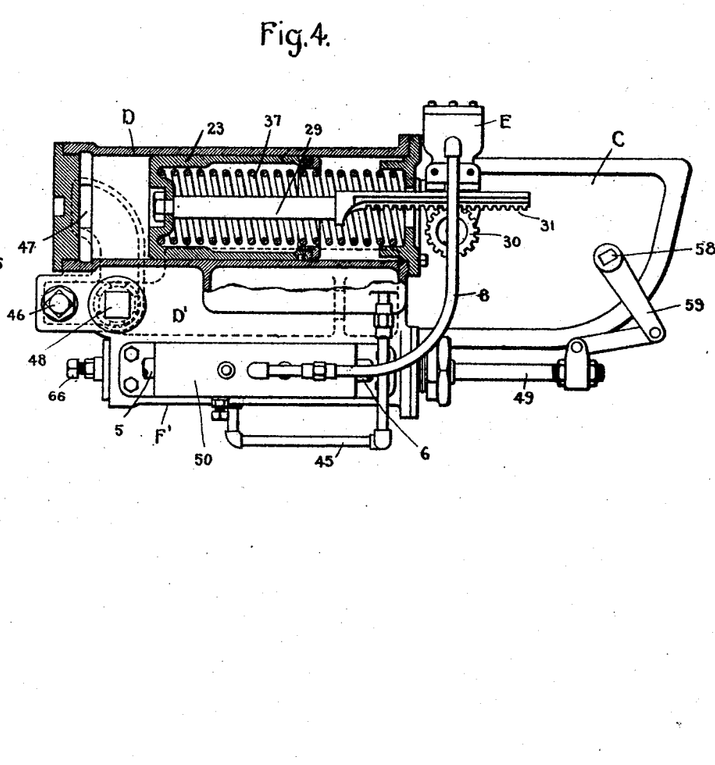
Fig. 4 is a plan view of the same with the controller-actuating piston and cylinder shown in section.

As shown in Figs. 3 and 5, the controller and reversing-switch operating mechanisms are held in position on the top of the controller-casing by the bracket 61 and are also supported from the car-platform or any other convenient point by the supporting-rod 60.

Figures 8, 9, 10, 11:
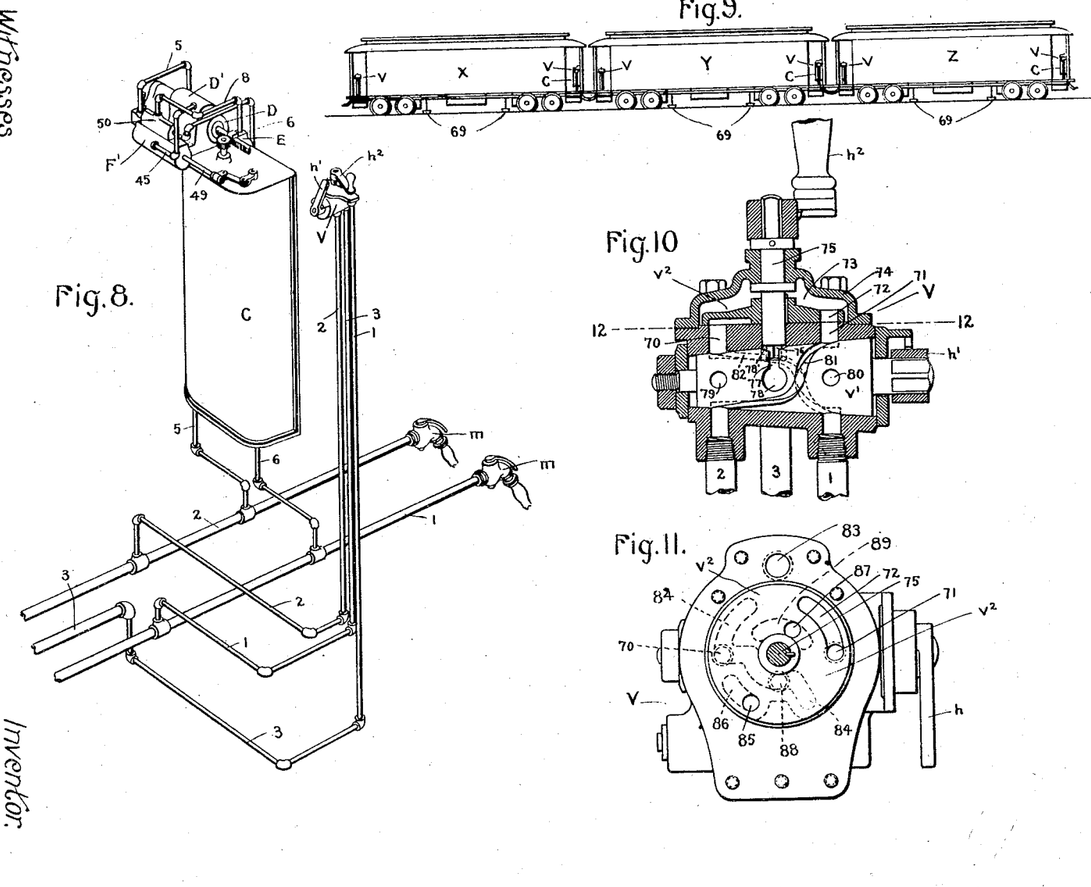
Fig. 8 is a perspective view of one of the controllers on a car and shows the pneumatic operating mechanism and the pipes connecting the same to the train and supply pipes.
Fig. 9 represents diagrammatically a train of cars equipped with my improved system of motor control.
Fig. 10 is a vertical section through the controlling or motorman's valve.
Fig. 11 is a plan view of the said motorman's valve, the upper part of the valve-casing being removed to show the controlling disk valve in position on its seat.
Figures 12, 13:
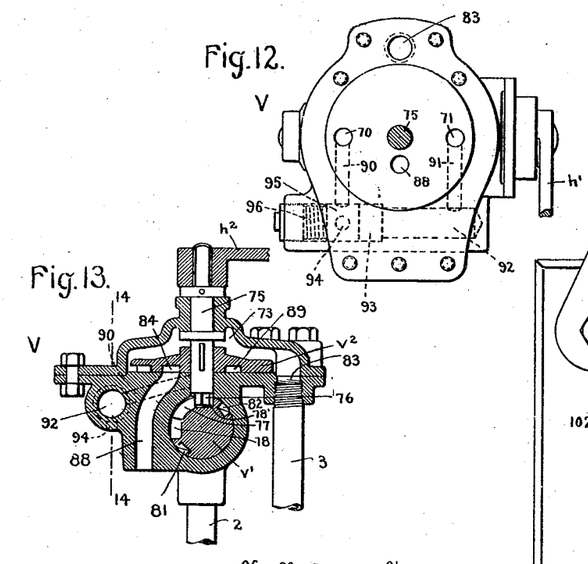
Fig. 12 is a plan view of the said valve taken along the lines 12 12 in Fig. 10, the disk valve and upper part of the valve-casing being removed to show the ports in said valve-seat and also in dotted lines the relative position of the automatically-actuated valve for "bleeding" or exhausting the parallel train-pipe when the series train-pipe breaks.
Fig. 13 is a vertical sectional view of the motorman's valve, taken in a plane at right angles to that of Fig. 10.
Figure 14:
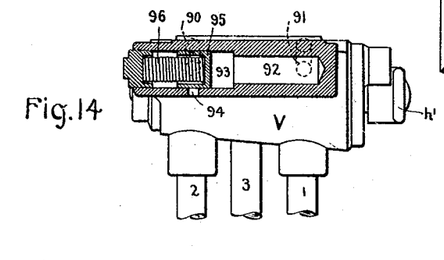
Fig. 14 is a section through the said automatic bleeding or exhaust valve, taken on the line 14 14 of Fig. 13.

In Fig. 8 I have shown in perspective a controller equipped with my improved pneumatic operating mechanism. This figure also illustrates very clearly the position of the controller C and the controller-actuating mechanism on the platform or other convenient part of the car relative to the motorman's controlling-valve V. The car body and platform have been omitted from this figure to allow the connections between the controller-actuating mechanism and the train-pipes to be more readily understood.

In Fig. 9 I have illustrated a train of three cars equipped with my system of control, so as to show the preferred positions of the controller and the motorman's valve. The three cars are represented by X, Y, and Z, respectively, and the controllers on each car are represented by C. It will be understood that but one controller on each car is operated when one of the controlling-valves V is operated by the motorman or operator, preferably from the forward end of the train. The motor-controller could be of the separately-actuated contact type and located under the car and the master-controller on each car could be equipped with my pneumatic operating devices, thus avoiding a multiplicity of train-wires. The current-collectors or contact-shoes carried by each car are represented by 69.

Referring now to Figs. 10 to 14, inclusive, which illustrate in detail my preferred form of controlling-valve V, $v'$ represents a reversing plug-valve having passage-ways which are adapted to connect the train-pipes 1 or 2 to the supply-pipe 3 when operated in conjunction with the disk valve $v^2$. When the reversing plug-valve $v'$ is moved into the position shown in Fig. 10 by means of the handle $h'$ and the disk valve $v^2$ is moved, by means of the handle $h^2$, connected with the valve-spindle 75, into the position shown in the same figure, the compressed air or other fluid is admitted to the train-pipe 2 from the supply-pipe 3 through the port 72 in said disk valve, the port 71 in the valve-seat, and the groove or passage-way 81 on the surface of said plug-valve. The space 73 between the casing 74 and the disk valve $v^2$ is connected directly with the supply-pipe 3. The movement of said valves into the position just indicated causes the reversing-switch RS at the controller to be thrown into the desired position and thereafter causes the controllers to be moved forward through their various series operative positions to the final series position, at which time the said forward movement is arrested by the operation of the series stop E, described above.

When it is desired to move the controllers from the final series position into the parallel positions, the disk valve $v^2$ is rotated further, by means of the handle $h^2$, until the port 86, which extends through the disk valve $v^2$, as shown in Fig. 11, is brought into register with the port 70 in the valve-seat. The compressed fluid then passes from the space or chamber 73 above the disk valve $v^2$ through the said ports 86 and 70, thence through the passage-way 82, formed in the reversing plug-valve $v'$, (indicated in dotted lines in Fig. 10,) thence into the train-pipe 1. The admission of compressed fluid to the train-pipe 1 releases each of the series stops E, as has been before described, and allows the controllers to be moved into the parallel positions.

When it is desired to reverse the direction of translation of the train, the reversing-switches on the various cars constituting the train are operated simultaneously by admitting compressed air to the train-pipe 1 before the air is admitted to the train-pipe 2. This is accomplished by rotating the plug-valve $v'$ by means of the handle $h'$ until the ports 79 and 80, which are bored through the plug-valve $v'$, are brought into register with the ports 70 and 71, respectively, in the valve-seat. Then as the disk valve $v^2$ is moved forward from its off position through the proper positions corresponding to the series and parallel positions of the controller the compressed fluid passes from the supply-pipe 3 through the ports 72, 71, and 80 into the train-pipe 1 for the series position and through the ports 85, 70, and 79 into the train-pipe 2, while the pressure is still maintained in train-pipe 1 to allow the controllers to move into the parallel positions.

When it is desired to return the controllers throughout the train to the off position, the train-pipes 1 and 2 are exhausted to the atmosphere. This is accomplished by rotating the disk valve $v^2$ by means of the handle $h^2$ until the undercut passage-way 84, formed in the said valve $v^2$ and shown in dotted lines in Fig. 11, is brought into register with the ports 70 and 71 in the valve-seat and also into register with the passage-way 88, which communicates with the atmosphere, as clearly shown in Fig. 13.

In order to prevent any movement of the reversing-valve $v'$ when the controlling-valve $v^2$ is in any one of its operative positions, I have provided an interlocking device between the said valves which comprises an elongated extension or key 76, formed on the lower end of the valve-spindle 75 and operating in the keyway 77, having enlarged ends 78 and 78' formed in the plug-valve $v'$. The keyway 77 is so formed that while the reversing-valve $v'$ is being moved from its forward to its reverse position the disk valve carried by the valve-spindle is obliged to be in the position corresponding to the off position of the controller. Also while the valve $v'$ is moving from its forward to its reverse position it is impossible to operate the valve $v^2$. The enlarged portions 78 and 78' of the slot 77 are just large enough to allow the elongated key 76 to rotate freely therein without striking against the side walls of the slot, thus allowing movement of the valve $v^2$ when the reversing-valve $v'$ has been thrown into either its forward or its reverse position.

It sometimes happens that one of the train-pipes or one of the connecting-pipes becomes broken or ruptured in such a way as to exhaust the air from said train-pipe, and if this should happen to the series pipe — that is, the train-pipe which has been charged with compressed fluid for the purpose of moving the controllers into the series positions — at the time the controllers are being operated in their parallel positions it would have the effect of causing the compressed fluid in the other train-pipe to move the reversing-switches on the cars into the reverse position. This will start the motors in the opposite direction before the car or train has come to a full stop, and thus tend to drive the train in a direction reverse to that in which it is running. It will be readily seen that such a condition of affairs will be very inconvenient, if not absolutely dangerous. To avoid the reversing of the motor connections when the series pipe breaks while the controllers are running in their parallel positions, I have supplied an automatic valve, which will operate to bleed or exhaust the second train-pipe or parallel pipe when the series pipe breaks. This valve is clearly shown in Figs. 12, 13, and 14 and is indicated as 95. The said valve 95 operates in a chamber 93 in a casing formed integral with the valve-seat, on which the valve $v^2$ operates. The chamber 93 has a passage-way 90 leading to it from the port 70 in the said valve-seat. The port 71 in the valve-seat of the valve $v^2$ is also connected, through passage-way 91 and the passage-way 92, with the said valve-chamber 93. Leading from said valve-chamber is a normally open exhaust-port 94, which is covered by the cup-shaped valve 95 when said valve is forced to the left against the action of the spring 96 by compressed fluid admitted to said chamber 93 through the passage-ways 91 and 92 whenever the disk valve $v^2$ is moved into its first operative position — that is, into a position to admit compressed fluid to the train-pipe, which for the time being is acting as the series train-pipe. In the construction herein shown the compressed fluid is always admitted to the port 71 in the valve-seat before it is admitted to the port 70, regardless of the position of the reversing plug-valve $v'$. When the series train-pipe is broken or ruptured in any way — for instance, if the train-pipe 2 should be acting as the series pipe, as shown in Fig. 10, and should become broken — the compressed fluid will be exhausted from said train-pipe and the pressure will be removed from the valve 95, allowing said valve to move to the right by the action of the spring 96 and uncover the exhaust-port 94, so as to allow the train-pipe 1 to be exhausted to atmosphere through the port 70 and the passage-way 90 leading to the valve-chamber 93. This bleeding or exhaust valve is perfectly automatic in its action and renders the system safe and prevents the liability of accident from the causes enumerated above.

Figure 15:
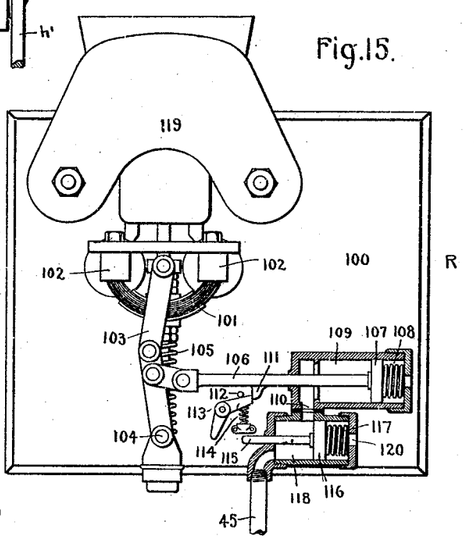
Fig. 15 illustrates one form of a pneumatically-controlled circuit-breaker which automatically opens the trolley or motor circuit whenever the pressure in the controller-actuating cylinder is reduced below a predetermined amount.

Connected in the trolley or motor circuit T, Fig. 2, leading to the controller C, is a circuit-breaker R, which operates to open the said trolley-circuit whenever the pressure in the auxiliary reservoir D' and the pipe 45 is reduced below a predetermined limit. One specific form of such a circuit-breaker is illustrated in Fig. 15, and it may be used to open the trolley connections to the controller or to open the motor-circuits at any desired point whenever the pressure in the train-pipes or connecting-pipes is reduced below a predetermined amount. This circuit-breaker is illustrated as connected to the pipe 45, leading to said oil-cylinder D', it being understood that the circuit-breaker may be connected to the pneumatic controller-actuating apparatus in other parts of the pipe connections and accomplish the same result as above described. The electrical switch and pneumatic means for operating the same are mounted on a base-board 100, the movable and fixed contacts of said switch being indicated by 101 and 102, respectively. The movable contact or brush 101 is operated to close the desired circuit by means of the piston 107, which is actuated by compressed fluid admitted to the cylinder 109 through the port 110, the connection between the said piston 107 and the switch member 101 being made by means of the piston-rod 106, which is pivotally attached to the toggle-lever 103, one arm of which is pivoted to the base-plate at 104 and the other arm of which is pivoted to the member 101. The spring 105 acts to increase the rapidity with which the movable switch member 101 operates to open the circuit. The piston 116, operating in the cylinder 118, which is connected to the pipe 45, acts as a valve to control the port 110, leading to the cylinder 109, and also acts as a trip for the catch which is used to hold the circuit-breaker in its closed position. The said trip acts through the piston-rod 115 directly on one arm of the catch, which is here shown as a bell-crank lever 113, pivoted to the base-plate and normally maintained against the stop 112 by means of a spring 114. Said catch is adapted to coact with the lug 111, carried by the piston-rod 106. Mounted within the casing 119, which is fastened to the base-plate 100, are auxiliary switch-contacts which operate between the poles of the blow-out magnet in such a manner as is customary in the construction of circuit-breakers of this type.

In the operation of the circuit-breaker above described compressed fluid is admitted through the pipe 45 into the cylinder 118, and the piston 116 is forced to the right against the action of the spring 117 until the port 110 is uncovered, thereby admitting the compressed fluid into the cylinder 109 and forcing the piston 107 to the right against the action of the spring 108. This movement of the piston 107 straightens out the toggle-lever 103 and closes the movable member of the switch 101 against the fixed contacts 102. As such switch is closed one arm of the bell-crank lever 113 engages with the lug 111, carried by the piston-rod 106, and holds the switch in its closed position. Whenever the pressure in the pipe 45 is reduced below a predetermined amount, the spring 117 forces the piston 116 to the left, thereby shutting off the communication between the port 110 and the pipe 45 and opening the communication between said port 110 and the atmosphere through the opening 120 in the right-hand end of the cylinder 118. The movement of said piston 116 to the left causes the piston-rod 115 to engage with one arm of the bell-crank lever 113 and force the other arm of said lever away from the stop 112 against the action of the spring 114, so as to release the lug 111 and allow the piston-rod 106 to move to the left by the action of the spring 108, which bears against the piston 107. The action of the spring 105, which is tending to buckle the toggle-lever 103, aids the spring 108 and opens the switch with a rapid movement, which is desirable in circuit-breakers.

In the operation of the system shown in Fig. 2 and the remaining figures and described above when compressed fluid is admitted to the train-pipe 2 from the supply-pipe 3 through the motorman's valve V the compressed fluid passes from said train-pipe through the pipe 5 into the valve-casing 50, thereby moving the slide-valve 51 to the right, so as to bring the port 52' into register with the port 52 and move the port 54ª out of register with the port 54, which leads to the pipe 8, connected with the series-stop mechanism. The compressed fluid then passes through the port 52 in the left-hand end of the cylinder F', forcing the piston 40 to the right, thereby moving the reversing-switch RS into the position shown in Fig. 2. The compressed fluid then passes through the pipe 45 after the port leading to said pipe is uncovered by the piston 40 and closes automatically the circuit-breaker R on its way to the oil-reservoir D'. The oil is then forced from said reservoir D' through the port controlled by the adjustable valve 46 through passage-way 47 into the cylinder D. The piston 23 is then moved to the left against the action of the spring 37, operating the drum or cylinder of the controller C, until the said drum reaches its last series position, at which time the lug 41 strikes against the pin 42 and further forward movement is arrested. When it is desired to move past the last series position into the parallel positions of the controller, compressed fluid is admitted to the train-pipe 1 through the engineer's valve V, as above described, the compressed fluid then passing through the pipe 6 into the right-hand end of the valve-casing 50 through the port 54ᶜ in said valve 51, which at this time is in register with the port 54ᵇ, thence through the passage-way 67, pipes 8 and 9, into the cylinder E above the piston 43. The said piston 43 is thereby forced backward against the action of the spring 44 and releases the pin 42 from engagement with the lug 41, thus allowing the piston 23 to move forward, so as to move the controller C into its parallel positions. In order to return the controller to its off position, both train-pipes 1 and 2 are exhausted to the atmosphere by operation of either of the motorman's valves V and V', and the spring 37 moves the piston 23 to its initial position, thereby forcing the oil contained in said cylinder D into the reservoir D' through the check-valve 48. The piston 23 thereby has a rapid backward movement and returns the controller rapidly to its off position. In order to reverse the direction of the train, the reversing-valve v' is turned into its reverse position, thereby admitting compressed fluid to the train-pipe 1 when the controlling-valve v' is moved into its operative positions, as above described, before admitting it to the train-pipe 2. The valve 51 is thus moved over to the left, thereby bringing the port 53' into register with the port 53, leading to the right-hand end of the cylinder F', and causes the piston 40 to be moved by the compressed fluid to the left to actuate the reversing-switch RS into its reverse position. After the piston 40 moves the reversing-switch it uncovers the port leading to the pipe 45, and the compressed fluid is admitted to the oil-reservoir D' through said pipe 45. The means above described prevents the operation of the controller before the reversing-switch has been thrown into the desired position. When the controller is in any one of its operative positions, the interlock which may be connected between the said controller drum or cylinder and the reversing-switch RS will prevent the said reversing-switch from being moved from the position into which it is first thrown by the operation of the piston 40. The automatic slide-valve 51 is also supplied with small ports 55 and 55', which allow the fluid contained in one end of the cylinder F' to be forced out of said cylinder into one of the train-pipes as the compressed fluid is being admitted to the opposite end of said cylinder F' from the other train-pipe.

The operation of but one controller and reversing-switch actuating mechanism on the train has been described; but it will be clearly understood that all the controllers on the train are moved simultaneously after the reversing-switches have been simultaneously moved into the desired position.

The specific form of interlocking device between the motorman's operating-valve and the reversing-valve herein shown and described does not constitute part of my invention, the same being claimed in an application of Fred B. Corey, filed contemporaneously herewith, Serial No. 133,979.

I have herein shown and described my invention in its preferred form; but I do not intend to be limited thereto, as many modifications may suggest themselves to persons skilled in the art to which this invention pertains without departing from the spirit and scope of my invention.

What I claim as new, and desire to secure as Letters Patent of the United States, is—

1. In a train-control system, a series-parallel controller comprising separate reversing and controlling switches, pneumatic means for actuating the switches of said controller, two train-pipes connected with said actuating means, and means for admitting compressed fluid at substantially a constant pressure to said train-pipes to operate said switches to give either the series or the parallel position of the controller in either the forward or the reversed direction of movement of the car or train.

2. In a motor-control system, a controlling-switch, pneumatic means for actuating said controlling-switch, a reversing-switch, pneumatic means for actuating said reversing-switch, means for preventing the operation of said controlling-switch until said reversing-switch has been operated, and means for preventing the movement of said reversing-switch while the controller is in any of its operative positions.

3. In a pneumatically-operated system of train control, a plurality of motor-controllers, two train-pipes, connections between the said train-pipes and said controllers, and means for admitting compressed fluid at substantially a constant pressure to said train-pipes so as to move said controllers into series and parallel positions either in the forward or reversed direction of movement of the car or train.

4. In a pneumatically-operated system of train control, a plurality of motor-controllers, two train-pipes, connections between said train-pipes and said controllers, and a controlling or motorman's valve adapted to admit compressed fluid at substantially a constant pressure from a source of supply to said train-pipes so as to cause said controllers to move simultaneously into either the series or parallel positions in either the forward or reversed direction of movement of the car or train.

5. In a train-control system, a plurality of series-parallel controllers each comprising a controlling-switch and a reversing-switch, pneumatic means for actuating said controllers, two train-pipes operatively connected to said controller-actuating means, a source of compressed-fluid supply, and means for admitting compressed fluid to said train-pipes at substantially a constant pressure from said source in order to produce a simultaneous movement of said controlling-switches into either the final series position or the final parallel position independent of the direction of movement of the car or train.

6. In a train-control system, a plurality of pneumatically-actuated series-parallel controllers, two train-pipes, and a controlling or motorman's valve constructed and arranged to admit compressed fluid at substantially a constant pressure to said train-pipes to produce a simultaneous movement of said controllers into either series or parallel positions in either the forward or reversed direction of movement of the car or train.

7. In a train-control system, a plurality of pneumatically-actuated controllers, two train-pipes connected therewith, a source of compressed-fluid supply, and means under the control of the motorman for admitting compressed fluid from said source of supply to each of said train-pipes, the pipe into which the compressed fluid is first admitted determining the direction of movement of the car or train.

8. In a train-control system, a plurality of pneumatically-actuated controllers, two train-pipes operatively connected therewith, a source of compressed-fluid supply, and a controlling or motorman's valve so constructed and arranged as to control the admission of compressed fluid from said source of supply to said train-pipes in a certain order, the pipe into which the compressed fluid is first admitted determining the direction of movement of the car or train.

9. In a train-control system, a plurality of pneumatically-actuated controllers, two train-pipes operatively connected therewith, a source of compressed-fluid supply, and a controlling or motorman's valve so constructed and arranged as to control the admission of compressed fluid from said source of supply to said train-pipes in a predetermined order and for exhausting the said compressed fluid from said train-pipes, the pipe into which the compressed fluid is first admitted determining the direction of movement of the car or train.

10. In a motor-control system, a plurality of pneumatically-actuated controlling-switches and reversing-switches, two pipes connected with the means for actuating said switches, a source of compressed-fluid supply, and a means under the control of the operator or motorman for admitting compressed fluid to said pipes in a predetermined order to move said controlling-switches into their successive operative positions, the pipe into which the compressed fluid is first admitted determining the position of the reversing-switches.

11. In a train-control system, a plurality of pneumatically-actuated controlling-switches and reversing-switches, two train-pipes operatively connected therewith, a source of compressed-fluid supply, and a controlling or motorman's valve constructed and arranged to admit compressed fluid from said source of supply to both of said train-pipes in a predetermined order to move said controlling-switches through their successive operative positions and to exhaust the pipes to atmosphere, the train-pipe into which the compressed fluid is first admitted determining the position of said reversing-switches thereby determining the direction of movement of the car or train.

12. In a train-control system, a controlling-switch and a reversing-switch for the motor or motors on each car, pneumatically-actuated mechanisms for operating said controlling-switches simultaneously, pneumatically-actuated mechanisms for operating said reversing-switches simultaneously, said reversing-switches being moved into the desired position before said controlling-switches are operated, two train-pipes connected with said pneumatically-actuated mechanisms, a source of compressed-fluid supply, and means for admitting compressed fluid to both of said train-pipes in a predetermined order to operate said controlling and reversing switches.

13. In a train-control system, a controlling-switch and a reversing-switch for the motor or motors on each car, pneumatically-actuated mechanisms for operating said controlling-switches simultaneously and said reversing-switches simultaneously, two train-pipes operatively connected with said pneumatically-actuated mechanisms, a series stop for each controlling-switch, a source of compressed-fluid supply, and means for admitting compressed fluid to said train-pipes to operate said controlling-switches, reversing-switches and said series stops.

14. In a motor-control system, a controlling-switch and a reversing-switch, pneumatically-actuated mechanisms for operating said controlling and reversing switches, two pipes operatively connected with said pneumatically-actuated mechanisms, a series stop, a source of compressed-fluid supply, and means for admitting compressed fluid to said pipes to operate the controlling and reversing switches and said series stop.

15. In a train-control system, a controlling-switch and a reversing-switch for the motor or motors on each car, pneumatically-actuated mechanisms for operating said controlling-switches simultaneously and said reversing-switches simultaneously, two train-pipes operatively connected with said pneumatically-actuated mechanisms, a pneumatically-actuated series stop for each controlling-switch, a source of compressed-fluid supply, and means for admitting compressed fluid to said train-pipes to operate said controlling-switches and series stops, said reversing-switches being moved into the desired position before said controlling-switches are moved from the initial or "off" position.

16. In a train-control system, a controlling-switch and a reversing-switch for the motor or motors on each car, pneumatically-actuated mechanisms for operating said controlling-switches simultaneously and said reversing-switches simultaneously, two train-pipes operatively connected with said pneumatically-actuated mechanisms, a series stop for each controlling-switch, a source of compressed-fluid supply, and means for admitting compressed fluid from said source of supply to one of said train-pipes in order to move said reversing-switches into the desired position and to move said controlling-switches forward into the final series position then while pressure is maintained on said pipe to admit compressed fluid to the other train-pipe to actuate said series stops.

17. In a train-control system, a controlling-switch and a reversing-switch for the motor or motors on each car, pneumatically-actuated mechanisms for operating said controlling-switches simultaneously and said reversing-switches simultaneously, two train-pipes operatively connected with said pneumatically-actuated mechanisms, a series stop for each controlling-switch, a source of compressed-fluid supply, and a controlling or motorman's valve for controlling the admission of compressed fluid from said source of supply to one of said train-pipes in order to move said reversing-switches into the desired position and to move said controlling-switches forward into the final series position then while pressure is maintained on said pipe to admit compressed fluid to the other train-pipe to actuate said series stops and also to exhaust the compressed fluid from said train-pipes to atmosphere.

18. In a train-control system, a controlling-switch and a reversing-switch for the motor or motors on each car, pneumatically-actuated mechanisms for operating said controlling-switches simultaneously and said reversing-switches simultaneously, two train-pipes operatively connected with said pneumatically-actuated mechanisms, a source of compressed-fluid supply, and motorman's valves located on the cars of the train any one of which may be used to control the admission of compressed fluid to said train-pipes at substantially a constant pressure to move said reversing-switches into the desired position and to actuate said controlling-switches through their successive operative positions after said reversing-switches have been actuated.

19. In a train-control system, a motor or motors mounted on one or more cars of the train, a motor-controlling switch, a reversing-switch and a series stop mounted on each motor-car, pneumatically-actuated mechanisms for operating each controlling-switch, reversing-switch and series stop, two train-pipes connected with said pneumatically-actuated mechanisms, a source of compressed-fluid supply, and means located on each car for controlling the supply of compressed fluid to and the exhaust of the same from said train-pipes whereby the motors on each motor-car may be connected in series or in parallel in either the forward or reversed direction.

20. In a train-control system, motors mounted on one or more cars of the train, a motor-controlling switch, a reversing-switch and a series stop mounted on each motor-car, pneumatically-actuated mechanisms for operating each controlling-switch, reversing-switch and series stop, two train-pipes operatively connected with said pneumatically-actuated mechanisms, a source of compressed-fluid supply and a controlling or motorman's valve located on each car and adapted to be used for controlling the supply of compressed fluid to and the exhaust of the same from said train-pipes whereby the motors on each motor-car may be connected in series or in parallel in either the forward or reversed direction.

21. In a pneumatic train-control system, a pneumatically-actuated controller, a source of compressed-fluid supply, train-pipes connected with said source of supply and said controller, a circuit-breaker in the motor-circuit in which said controller is located, automatic means for operating said circuit-breaker to close said circuit when the pressure in the train-pipes rises above a predetermined limit, and means for operating said circuit-breaker to open the control-circuit whenever the pressure in said train-pipes falls below said predetermined limit.

22. In a train-control system, a motor-circuit, a controller, pneumatic actuating means for said controller, an automatic circuit-breaker in said circuit, pneumatically-actuated means for closing said circuit-breaker when the pressure in said controller-actuating means rises above a predetermined limit, and means for opening said circuit-breaker when the pressure falls below said predetermined limit.

23. In a motor-control system, a motor-circuit, a controller in said circuit, pneumatically-actuated means for operating said controller, a normally open valve for controlling the admission of compressed fluid to said controller-actuating means, and a solenoid or magnet for closing said valve when the current in the motor-circuit rises above a predetermined amount.

24. In a train-control system, a motor-circuit, a controller in said circuit, pneumatically-actuated means for operating said controller, a normally open valve for controlling the admission of compressed fluid to said controller-actuating means, a solenoid or magnet for closing said valve, and means for connecting said solenoid in shunt to the field of one of the motors on the car or train when the current in the motor-circuit rises above a predetermined amount.

25. In a motor-control system, a controller, pneumatically-actuated means for operating said controller, a source of compressed-fluid supply, a valve between said source of compressed-fluid supply and said controller-operating means, and means for automatically closing said valve when said controller has reached a predetermined position in its forward movement.

26. In a motor-control system, a controller, pneumatically-actuated mechanism for operating said controller, a source of compressed-fluid supply, a normally open valve between said source of supply and said controller-actuating mechanism, and means actuated by said controller in its forward movement for closing said valve to cause said controller to stop when it has reached a certain predetermined position in its forward travel.

27. In a motor-control system, a controller, pneumatically-actuated means for operating said controller, a source of compressed-fluid supply, a valve between said source of supply and said controller-actuating means, means for automatically closing said valve when the controller has reached a predetermined position in its forward movement, and means for releasing said valve-closing means to allow said valve to open.

28. In a motor-control system, a controller, pneumatically-actuated means for operating said controller, a source of compressed-fluid supply, a valve between said source and said controller-actuating means, means for automatically closing said valve when the controller has reached a predetermined position in its forward movement, and pneumatically-actuated means controlled from a distant point for releasing said valve-closing means to allow the valve to open.

29. In a motor-control system, a plurality of series-parallel motor-controllers, pneumatically-actuated means for operating said controllers, a source of compressed-fluid supply, a valve between said source of compressed-fluid supply and each of said controller-actuating means, and means for automatically closing said valves when the controllers reach their final series position.

30. In a motor-control system, a plurality of series-parallel motor-controllers, pneumatically-actuated mechanisms for operating said controllers, a source of compressed-fluid supply, a valve between said source of compressed-fluid supply and each of said controller-actuating mechanisms, and means actuated by said controllers for closing said valves when the controllers reach the final series position.

31. In a motor-control system, a plurality of series-parallel motor-controllers, pneumatically-actuated means for operating said controllers, a source of compressed-fluid supply, a valve between said source of compressed-fluid supply and each of said controller-actuating means, means for automatically closing said valves when the controllers reach the final series position, and means for releasing said valve-closing means to allow said valves to open so that the controllers may continue their forward movement.

32. In a motor-control system, a plurality of series-parallel motor-controllers, pneumatically-actuated means for operating said controllers, a source of compressed-fluid supply, a valve between said source of supply and each of said controller-actuating means, means for automatically closing said valves when said controllers reach the final series position, and pneumatically-actuated means controlled from a distant point for releasing said valve-closing means to allow said valves to open so that the controllers may continue their forward movement.

33. In a motor-control system, a plurality of series-parallel motor-controllers, pneumatically-actuated means for operating said controllers, a source of compressed-fluid supply, a normally open valve between said source of compressed-fluid supply and each of said controller-actuating means, means for automatically closing said valves when the controllers reach the final series position, pneumatically-actuated means for releasing said valve-closing means, and means for controlling the operation of said valve-releasing means.

34. In a train-control system, a plurality of series-parallel motor-controllers, pneumatically-actuated means for operating said controllers, a source of compressed-fluid supply, a train-pipe connected with said controller-operating means, means for connecting said train-pipe to said source of supply, a valve between said train-pipe and each of said controller-operating means, means for closing said valves when the controllers reach the final series position, and pneumatically-actuated means for releasing said valve-closing means.

35. In a train-control system, a plurality of series-parallel motor-controllers, pneumatically-actuated means for operating said controllers, a source of compressed-fluid supply, a train-pipe connected with said controller-actuating means, a valve between said train-pipe and each of said controller-actuating means, means for maintaining said valves normally open, means for closing said valves when the controllers reach the final series position, pneumatically-actuated means for releasing said valve-closing means, a train-pipe connected with said pneumatically-actuated valve-releasing means, and a motorman's valve for controlling the admission of compressed fluid to said train-pipes.

36. In a pneumatically-actuated train-control system, a plurality of pneumatically-actuated controllers, two train-pipes connected therewith, a source of compressed-fluid supply, and a motorman's valve having ports so constructed and arranged as to control the admission of compressed fluid from said source of supply to either or both of said train-pipes and to exhaust the same from said pipes.

37. In a pneumatically-actuated train-control system, a plurality of pneumatically-actuated controllers, a plurality of train-pipes connected therewith, a source of compressed-fluid supply, and means adapted to control the admission of compressed fluid to any one or all of said train-pipes and to exhaust said compressed fluid from said pipes.

38. In a pneumatically-actuated train-control system, a source of compressed-fluid supply, two train-pipes, and a motorman's valve having ports so constructed and arranged that when the valve is in one position the train-pipes are exhausted to atmosphere, when in a second position one of said pipes is connected to the source of compressed-fluid supply and when in a third position both of said pipes are connected to said source of supply.

39. In a pneumatically-actuated train-control system, a source of compressed-fluid supply, two train-pipes, a motorman's valve having ports so constructed and arranged that when the valve is in one position the train-pipes are exhausted to atmosphere, when in a second position one of said pipes is connected to the source of compressed-fluid supply and when in a third position both of said pipes are connected to said source of supply, and a separate valve operatively connected to said train-pipes having ports so constructed and arranged as to reverse the relative position of the train-pipes with respect to the motorman's valve.

40. In a pneumatically-actuated train-control system, a source of compressed-fluid supply, two train-pipes, a motorman's valve having ports so constructed and arranged that when the valve is in one position the train-pipes are exhausted to atmosphere, when in a second position one of said pipes is connected to the source of compressed-fluid supply and when in a third position both of said pipes are connected to said source of supply, a separate valve operatively connected to said train-pipes having ports so constructed and arranged as to reverse the relative position of the train-pipes with respect to the motorman's valve, and an interlock between said valves.

41. In a pneumatically-actuated train-control system, a plurality of pneumatically-actuated controllers, a source of compressed-fluid supply, a plurality of train-pipes operatively connected with said controllers and with said source of supply, and means for automatically reducing the pressure in one of said train-pipes when the pressure in another falls below a predetermined limit.

42. In a pneumatically-actuated system of train control, a plurality of pneumatically-actuated controllers, a source of compressed-fluid supply, two train-pipes operatively connected with said controllers and adapted to be connected with said source of supply, and an automatically-actuated valve to exhaust one of said train-pipes to atmosphere when the pressure in the other of said pipes is reduced below a predetermined limit.

43. In a pneumatically-actuated system of train control, a plurality of pneumatically-actuated controllers, a source of compressed-fluid supply, two train-pipes operatively connected with said controllers and adapted to be connected with said source of supply, an automatically-actuated valve to exhaust one of said train-pipes to atmosphere when the pressure in the other of said pipes is reduced below a predetermined limit, and a reversing-valve for changing the relative position of said exhaust-valve with respect to said pipes.

44. In a pneumatically-actuated system of train control, a source of compressed-fluid supply, two train-pipes, means for connecting said pipes to said source of supply, and independent means for automatically controlling the exhaust of one of said train-pipes when the pressure in the other of said pipes is reduced below a predetermined limit.

45. In a pneumatically-actuated system of train control, a source of compressed-fluid supply, two train-pipes, means for connecting said pipes to said source of supply, independent means for automatically controlling the exhaust of one of said train-pipes when the pressure in the other of said pipes is reduced below a predetermined limit, and means for reversing the connections between said automatically-actuated exhaust-controlling means and said pipes.

46. In a pneumatically-actuated system of train control, a source of compressed-fluid supply, two train-pipes, a valve for connecting both of said pipes to said source of supply, and a valve for closing a normally open exhaust-port in one of said pipes when the pressure in the other of said pipes rises above a predetermined limit.

47. In a pneumatically-actuated system of train control, a source of compressed-fluid supply, two train-pipes, a valve for connecting both of said pipes to said source of supply, a valve for closing a normally open exhaust-port in one of said pipes when the pressure in the other of said pipes rises above a predetermined limit, and means for operating said valve to open said exhaust-port when said pressure falls below said predetermined limit.

48. In a pneumatically-actuated system of train control, a source of compressed-fluid supply, two train-pipes, a valve for connecting both of said pipes to said source of supply, a valve for closing a normally open exhaust-port in one of said pipes when the pressure in the other of said pipes rises above a predetermined limit, means for operating said valve to open said exhaust-port when said pressure falls below said predetermined limit, and a separate valve having ports adapted to reverse the connections between the said pipes and said exhaust-port so that the last-mentioned train-pipe will be exhausted to atmosphere when the pressure in the first-mentioned pipe is reduced below said predetermined limit.

49. In a motor-control system, a controller, a pneumatically-actuated piston operatively connected with said controller, means for controlling the application of pressure to said piston, means for stopping said piston at a predetermined point in its movement, and pneumatically-actuated means for releasing said stopping means so as to allow said piston to move to the position corresponding to the final operative position of the controller.

50. In a motor-control system, a pneumatically-actuated controller, two pipes connected therewith, a source of compressed-fluid supply, a controlling-valve adapted to admit compressed fluid to one of said pipes and while the fluid-pressure is maintained in said pipe to admit compressed fluid to the other of said pipes to operate said controller through its successive operative positions.

51. In a motor-control system, a pneumatically-actuated controller, two pipes connected therewith, a source of compressed-fluid supply, a controlling-valve adapted to admit compressed fluid to one of said pipes and while the fluid-pressure is maintained in said pipe to admit compressed fluid to the other of said pipes, and a valve for reversing the pipe connections so that when the said controlling-valve is operated the compressed fluid will be admitted to the said pipes in reversed order.

52. In a motor-control system, a pneumatically-actuated controller, two pipes connected therewith, a source of compressed-fluid supply, a controlling-valve adapted to admit compressed fluid to one of said pipes and while the fluid-pressure is maintained in said pipe to admit compressed fluid to the other pipe, a valve for reversing the pipe connections so that when said controlling-valve is operated the compressed fluid will be admitted to the said pipes in reversed order, and an interlock between said operating and reversing valves.

53. In a pneumatic motor-control system, a plurality of pipes, a source of compressed-fluid supply, a controlling-valve for admitting compressed fluid to said pipes in a certain order, and a reversing-valve for changing the order in which the compressed fluid is admitted to the said pipes.

54. In a pneumatic motor-control system, a plurality of pipes, a controlling-valve for admitting compressed fluid to the pipes in a certain order, a reversing-valve for changing the order in which the compressed fluid is admitted to the said pipes, and an interlocking device between said valves.

55. In a pneumatic motor-control system, a plurality of pipes, a source of compressed-fluid supply, a disk valve for controlling the admission of compressed fluid to said pipes, a reversing plug-valve, and means for preventing said reversing plug-valve from being operated when said controlling disk valve is in any of its operative positions.

56. In a pneumatic motor-control system, a plurality of pipes, a source of compressed-fluid supply, a disk valve for controlling the admission of compressed fluid to said pipes, a reversing plug-valve, and means for preventing the operation of said disk valve unless said reversing plug-valve is in one of its operative positions.

57. In a motor-control system, a plurality of pneumatically-actuated controlling-switches, pneumatically-actuated reversing-switches and pneumatically-actuated series stops, a source of compressed-fluid supply, two pipes operatively connected with the means for actuating said controlling and reversing switches and series stops, and means for controlling the admission of compressed fluid to said pipes from said source of supply to operate said actuating means.

58. In a motor-control system, a controller, a pneumatically-actuated piston controlling the operation of said controller, a reversing-switch, pneumatically-actuated means for operating said reversing-switch and for controlling the application of pressure to said piston, and means for arresting the movement of said piston at a predetermined point intermediate the limits of its travel.

59. In a motor-control system, a controller, a reversing-switch, pneumatically-actuated means for controlling the operation of said controller and reversing-switch, a source of compressed-fluid supply, means for controlling the admission of compressed fluid from said source of supply to said pneumatically-actuated means, and means for arresting the controller-controlling means at a predetermined point intermediate the limits of its travel.

60. In a motor-control system, a controller, a pneumatically-actuated piston controlling the operation of said controller, means for controlling the application of pressure to said piston, means for arresting said piston at a predetermined point corresponding to one of the operative positions of the controller, and means for rendering said arresting means inoperative so as to allow the piston to move into a position corresponding to another operative position of the controller.

61. In a motor-control system, a controller, a pneumatically-actuated piston controlling the operation of said controller, a reversing-switch, pneumatically-actuated means for operating said reversing-switch and for controlling the application of pressure to said piston, a motorman's valve for connecting said pneumatically-actuated means to a source of compressed-fluid supply, and means independent of the motorman's valve for arresting the movement of said piston at a predetermined point intermediate the limits of its travel.

62. In a motor-control system, a controller, pneumatically-actuated means for operating said controller, means including a motorman's valve for connecting said pneumatically-actuated means to a source of compressed-fluid supply, and means independent of the motorman's valve for arresting the movement of the controller at a predetermined point of the limits of its travel.

63. In a motor-control system, a controller, pneumatically-actuated means for controlling the operation of said controller, a motorman's valve for connecting said pneumatically-actuated means to a source of compressed-fluid supply, and means independent of the motorman's valve for arresting the controller-controlling means at a predetermined point of the limits of its travel.

64. In a motor-control system, a controller, pneumatically-actuated means for operating said controller, a motorman's valve for connecting said operating means to a source of compressed-fluid supply, and means for disconnecting said operating means from said source of supply when the controller has reached a predetermined point.

65. In a motor-control system, a controller, pneumatically-actuated means for operating said controller, a motorman's valve for connecting said operating means to a source of compressed-fluid supply, and means for automatically disconnecting said operating means from said source of supply when the controller has reached a predetermined point.

66. In a motor-control system, a controller, pneumatically-actuated means for operating said controller, a motorman's valve for connecting said operating means to a source of compressed-fluid supply, and means for disconnecting said operating means from said source of supply when the controller has reached a predetermined point and also when the motor-current has reached a predetermined value.

In witness whereof I have hereunto set my hand this 4th day of December, 1902.

FRANK E. CASE.

Witnesses:
ALEX. F. MACDONALD,
HELEN ORFORD.